(12) United States Patent
Xue et al.

(10) Patent No.: US 9,448,434 B2
(45) Date of Patent: Sep. 20, 2016

(54) LIQUID CRYSTAL DISPLAY PANEL AND METHOD FOR DRIVING THE SAME

(75) Inventors: Jianshe Xue, Beijing (CN); Xiang Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 355 days.

(21) Appl. No.: 13/701,961

(22) PCT Filed: Jul. 11, 2012

(86) PCT No.: PCT/CN2012/078515
§ 371 (c)(1),
(2), (4) Date: Dec. 4, 2012

(87) PCT Pub. No.: WO2013/007200
PCT Pub. Date: Jan. 17, 2013

(65) Prior Publication Data
US 2013/0141659 A1    Jun. 6, 2013

(30) Foreign Application Priority Data
Jul. 13, 2011  (CN) .......................... 2011 1 0196239

(51) Int. Cl.
*G02F 1/1335* (2006.01)
*G02F 1/133* (2006.01)
(Continued)

(52) U.S. Cl.
CPC ....... *G02F 1/133555* (2013.01); *G02F 1/1368* (2013.01); *G02F 1/13306* (2013.01); *G09G 3/36* (2013.01); *G09G 3/3648* (2013.01); *G02F 2001/134345* (2013.01)

(58) Field of Classification Search
CPC .................. G02F 1/133555; G02F 1/134309; G02F 2203/09

USPC .................................................. 349/113–114
See application file for complete search history.

(56) References Cited

U.S. PATENT DOCUMENTS 7,119,761 B2 * 10/2006 Shen et al. ......................... 345/5
7,251,000 B2 *  7/2007 Okumura ....................... 349/114
(Continued)

FOREIGN PATENT DOCUMENTS

CN           1776491 A      5/2006
CN        101276106 A     10/2008
(Continued)

OTHER PUBLICATIONS

Internationai Preliminary Report on Patentability dated Jan. 14, 2014; PCT/CN2012/078515.
(Continued)

*Primary Examiner* — Paisley L Arendt
*Assistant Examiner* — Agnes Dobrowolski
(74) *Attorney, Agent, or Firm* — Ladas & Parry LLP

(57) ABSTRACT

Embodiments of the present invention disclose a liquid crystal display panel and a method of driving the same. A subpixel unit includes a transmissive portion and a reflective portion, the transmissive portion comprises a transmissive portion thin film transistor and a transmissive pixel electrode connected to a drain of the transmissive portion thin film transistor, the reflective portion comprises a reflective layer, a reflective portion thin film transistor and a reflective pixel electrode connected to a drain of the reflective portion thin film transistor, a gate of the transmissive portion thin film transistor and a gate of the reflective portion thin film transistor each are connected to a gate line of the subpixel unit, and a source of the transmissive portion thin film transistor and a source of the reflective portion thin film transistor are connected to different data lines.

17 Claims, 3 Drawing Sheets

(51) Int. Cl.
    *G02F 1/1368*    (2006.01)
    *G09G 3/36*      (2006.01)
    *G02F 1/1343*    (2006.01)

(56)  References Cited

U.S. PATENT DOCUMENTS

| 2006/0103792 A1 | 5/2006  | Lee et al.       |
| 2008/0204636 A1 | 8/2008  | Ge et al.        |
| 2008/0239181 A1 | 10/2008 | Jin              |
| 2010/0053482 A1 | 3/2010  | Koike            |
| 2010/0328290 A1 | 12/2010 | Jeong et al.     |
| 2011/0128458 A1 | 6/2011  | Morishita et al. |

FOREIGN PATENT DOCUMENTS

| CN | 101290415 A  | 10/2008 |
| CN | 101398574 A  | 4/2009  |
| CN | 101661176 A  | 3/2010  |
| KR | 100865843 B1 | 10/2008 |

OTHER PUBLICATIONS

First Chinese Office Action dated Dec. 27, 2013; Appln. No. 201110196239.7.

International Search Report mailed Apr. 10, 2012; PCT/CN2012/078515.

Chinese Rejection Decision Appln. No. 201110196239.7; Dated Feb. 9, 2015.

Second Chinese Office Action dated May 27, 2014; Appln. No. 201110196239.7.

Third Chinese Office Action Appln. No. 20110196239.7; Dated Sep. 29, 2014.

* cited by examiner

LIQUID CRYSTAL DISPLAY PANEL AND METHOD FOR DRIVING THE SAME

TECHNICAL FIELD

The present invention relates to a liquid crystal display panel and a method for driving the same.

BACKGROUND

Currently, in the industry of liquid crystal displays, thin film transistor-liquid crystal displays (TFT-LCDs) are relatively widely applied due to characteristics such as small volume, low power consumption, and etc. A backlight source and a liquid crystal panel are included in a common TFT-LCD. Light emitted from the backlight source is transmitted through a transparent pixel electrode on an array substrate of the liquid crystal panel and enters a liquid crystal layer, and after the adjustment by the optical rotation effect of the liquid crystal layer, exits a color filter substrate formed with color filters of the liquid crystal panel so as to form an image. As the light from the backlight source is transmitted through the liquid crystal panel for display, such TFT-LCD is also referred to as transmissive TFT-LCD.

However, when the transmissive TFT-LCD is used in strong light (e.g., sun shine), if the intensity of the external strong light which is irradiated on a screen is larger than the intensity of the light which is transmitted through the screen, it will be difficult for a user to clearly watch the contents displayed on the screen. To solve this problem, a transflective TFT-LCD is proposed. As shown in FIG. 1, a liquid crystal panel of a conventional transflective TFT-LCD includes: an array substrate 11, a color filter substrate 12, and a liquid crystal layer 13 formed between these two substrates that are disposed opposite to each other. Further, each subpixel unit on the array substrate comprises: a reflective region 111 and a transmissive region 112. Light from a backlight source passes through the transmissive region 112 and enters into the liquid crystal layer. In addition, light from an external light source (e.g., natural light and etc.) enters into the liquid crystal layer 13 after passing through the color filter substrate, is irradiated on the reflective region 111 of the array substrate 11, passes through the liquid crystal layer 13 again after being reflected by a reflector (e.g., a metal film and the like) in the reflective region 111, and exits the color filter substrate 12. As the transflective TFT-LCD uses not only the light from the backlight source (internal light), but also the reflected light from the light in surrounding environment (external light), the intensity of the light exiting the screen is increased, thereby it is easier for a user to watch the contents displayed on the screen.

SUMMARY

According to an embodiment of the present invention, there is provided a liquid crystal display panel, comprising: an array substrate, a color filter substrate and a liquid crystal layer interposed between the array substrate and the color filter substrate, wherein the array substrate is formed with a plurality of gate lines, a plurality of data lines and a plurality of pixel units thereon, the pixel units comprise at least three subpixel units; the subpixel unit each includes a transmissive portion and a reflective portion, the transmissive portion comprises a transmissive portion thin film transistor and a transmissive pixel electrode connected to a drain of the transmissive portion thin film transistor, the reflective portion comprises a reflective layer, a reflective portion thin film transistor and a reflective pixel electrode connected to a drain of the reflective portion thin film transistor, a gate of the transmissive thin film transistor and a gate of the reflective thin film transistor each are connected to the same gate line, and a source of the transmissive thin film transistor and a source of the reflective thin film transistor are connected to different data lines; the color filter substrate comprises a plurality of color filter units, the color filter unit comprises at least three color sub-units of different colors; and each of the color sub-units correspond to a subpixel unit on the array substrate.

According to another embodiment of the present invention, there is provided a method of driving the aforesaid liquid crystal display panel, comprising: at a same timing, different voltages are applied to the transmissive pixel electrode of the transmissive portion and the reflective pixel electrode of the reflective portion in a same subpixel unit.

BRIEF DESCRIPTION OF THE DRAWINGS

In order to clearly illustrate the technical solution of the embodiments of the invention or that in prior art, the drawings of the embodiments will be briefly described in the following; it is obvious that the described drawings are only related to some embodiments of the invention, and based on these drawings, those skilled in the art can obtain other drawings without any creative work.

DETAILED DESCRIPTION

The technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

As discovered by inventors of the present invention, although a conventional transflective TFT-LCD has its superiority, it still suffers from the following problems during design therefor.

Figure 1:
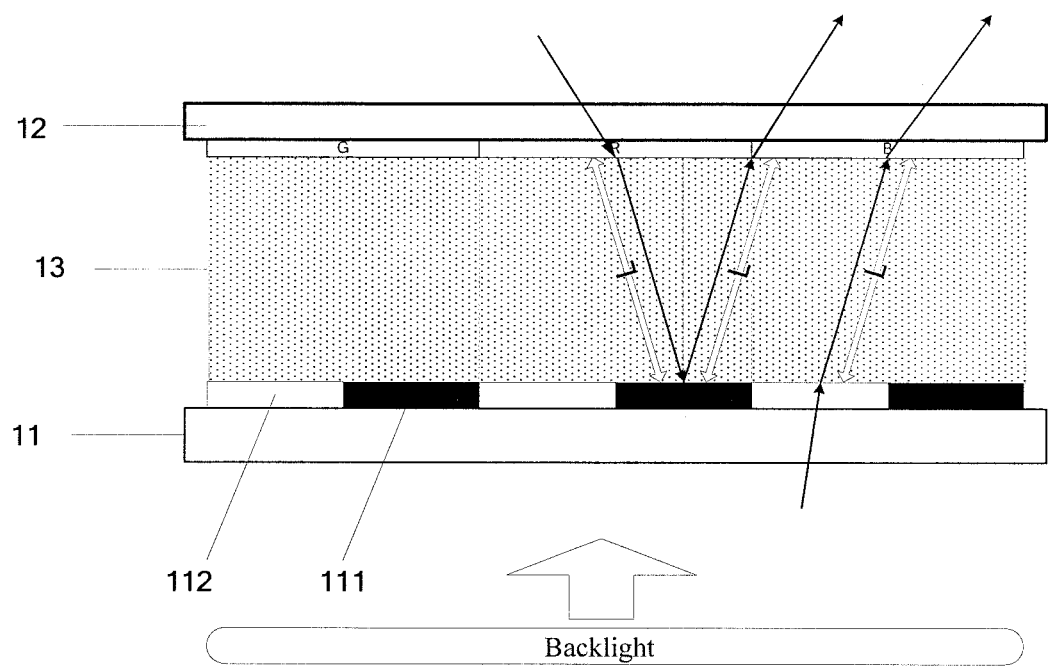
FIG. 1 is a schematic view showing a liquid crystal display panel of a transflective TFT-LCD in prior art.

As shown in FIG. 1, for a same viewing angle, the transmissive light (internal light) of the transflective TFT-LCD passes through the liquid crystal layer 13 only once and exits, and a travel distance in the liquid crystal layer is L; while the light from an external light source and reflected by the reflective region 111 needs to pass through the liquid crystal layer 13 twice, and a travel distance in the liquid crystal layer is 2 L; because the thickness of a reflective layer is quite small as compared to the thickness of the liquid crystal layer, the thickness of the reflective layer is neglected here. Optical distance is defined as the multiplication of a travel distance D of light in a medium by the refractive ratio n of the medium, i.e., optical distance=D*n. The refractive ratios of the liquid crystal layer over the reflective region and over the transmissive region for the same subpixel unit are consistent with each other. Consequently, the transmissive light and the reflected light give rise to an optical distance difference of n*L (n*2 L−n*L) due to different travel distances. The existence of the optical distance difference will cause the two kinds of light to produce an interference phenomenon, thereby leading to poor display effect.

In the conventional liquid crystal panel, because in a subpixel of the transflective TFT-LCD, there is an optical distance difference between the transmissive portion (transmissive region) and the reflective portion (reflective region), the display effect of the liquid crystal panel is poor due to interference produced between the reflected light and the transmissive light which are both used for display. With respect to this issue, embodiments of the present invention provide a liquid crystal display panel and a method for driving the liquid crystal display panel.

Figure 2:
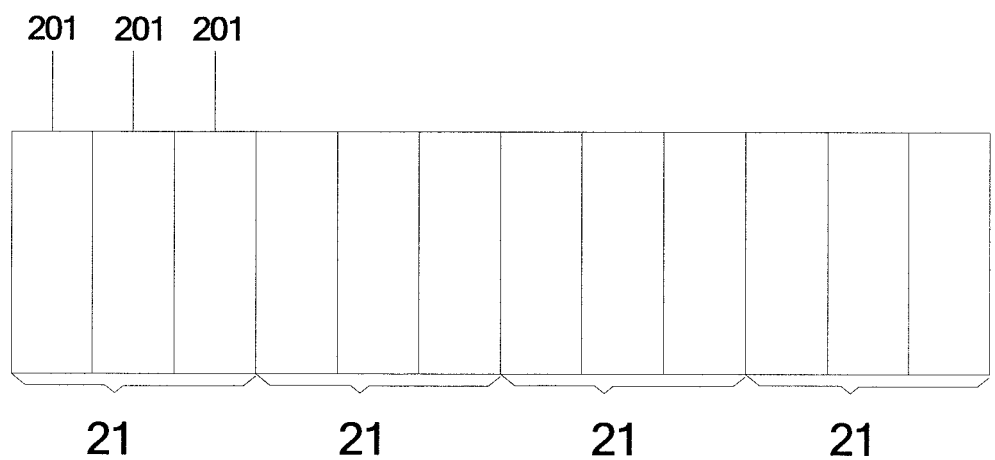
FIG. 2 is a schematic view showing a pixel unit provided by an embodiment of the present invention.

A liquid crystal display according to an embodiment of the present invention comprises an array substrate and a color filter substrate with a liquid crystal layer formed between the array substrate and the color filter substrate that are disposed opposite to each other. As shown in FIG. 2, a plurality of pixel units 21 are formed on the array substrate of the liquid crystal display, and each of the pixel units comprises at least three subpixel units 201.

Figure 3:
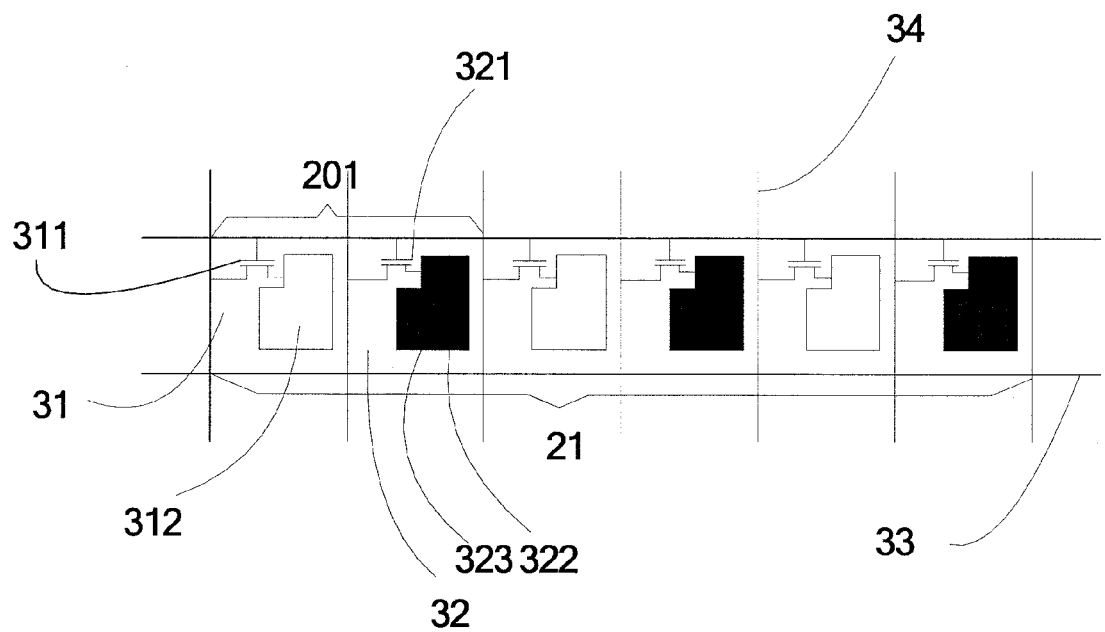
FIG. 3 is a top view showing one pixel unit provided by an embodiment of the present invention.

As shown in FIG. 3, each of the subpixel units 201 further includes a transmissive portion 31 and a reflective portion 32.

The transmissive portion 31 includes a transmissive thin film transistor 311 and a transmissive pixel electrode 312 connected to a drain of the transmissive thin film transistor 311; and the reflective portion 32 includes a reflective thin film transistor 321 and a reflective pixel electrode 322 connected to a drain of the reflective thin film transistor 321.

A gate of the transmissive thin film transistor 311 and a gate of the reflective thin film transistor both are connected to a same gate line 33, i.e., they are controlled by the same gate line 33, thus the gate line 33 corresponds to the pixel unit 21; and a source of the transmissive thin film transistor 311 and a source of the reflective thin film transistor 321 are connected to different data lines 34.

The data lines 34 are used to provide driving voltages to the transmissive pixel electrode 312 and the reflective pixel electrode 322, respectively.

Figure 4:
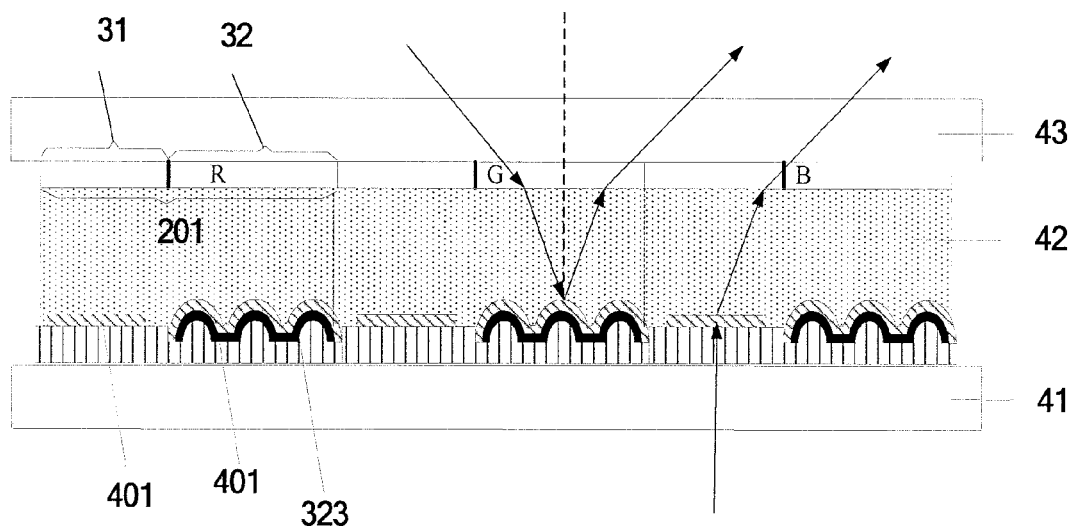
FIG. 4 is a front view showing one pixel unit provided by an embodiment of the present invention.

In the reflective portion 32, a reflective layer 323 is disposed over the reflective pixel electrode 322 or under the reflective pixel electrode 322. Because FIG. 3 is a top view of the pixel unit 21 and the reflective layer 323 and the reflective pixel electrode 322 may coincide in the figure, both are denoted in the same place in FIG. 3. For example, the position relationship of the reflective layer 323 and the reflective pixel electrode 322 may be referred to a front view showing a pixel unit on an array substrate in FIG. 4. In FIG. 4, disposing of the reflective layer 323 under the second pixel electrode 322 is illustrated as an example to represent their position relationship. Of course, the reflective layer 323 may also be disposed over the second pixel electrode 322.

A material for the reflective layer 323 may be a metal, a metal alloy, or a metal oxide substance having a reflectivity larger than or equal to that of aluminum, and aluminum (Al), silver (Ag) or an alloy thereof is usually be adopted to produce the reflective layer.

In another example, the reflective layer 323 and the second pixel electrode 322 are formed by a same conductive material having reflective property, for example, a metal such as aluminum, aluminum alloy, and the like, i.e., they are formed integrally and the same material layer have the functions as they possess.

As shown in FIG. 4, in the embodiment, there is not a reflective layer 323 in a transmissive portion 31, and light from a backlight source is transmitted through the array substrate 41 and incident into the liquid crystal layer 42; while there is provided the reflective layer 323 in the reflective portion 32, external light needs to pass through the color filter substrate 43 formed with color filters and enter into the liquid crystal layer 42, is reflected by the reflective layer 323, and then exits through the color filter substrate 43, and there is no transmissive light in the reflective portion 32.

For example, the reflective layer 323 can be formed as a non-planarized layer. For instance, a cross-section of the reflective layer 323 may be in a wavelike shape, triangle wave shape or sawtooth wave shape. The diffusion reflection of the external light at the reflective layer 323 can be enhanced if the reflective layer 323 is the non-planarized layer in the embodiment of the present invention, and therefore, lights exiting the color filter substrate 43 are made to be more consistent. Thus, display effect can be improved.

For example, the cross-section of the reflective layer 323 in the liquid crystal display panel as shown in FIG. 4 has a shape of wavelike, and the manufacture process of this wavelike shape reflective layer may be the same as a conventional process for example. For instance, after a gate insulating layer 401 is formed on the array substrate 41, the gate insulating layer 401 in the reflective portion 32 can be formed to be in the wavelike shape by using a photolithography process with a gray scale mask while the gate insulating layer 401 in the transmissive portion 31 is still a planarization layer; then, on the wavelike gate insulating layer 401 in the reflective portion 32, a wavelike reflective thin film is formed by depositing Al or Ag through a method of sputtering or heat evaporation, and is patterned to form the wavelike reflective layer 323. Other subsequent processes may be the same as a conventional process. Besides a photolithography process, a stamp process or the like can be used to form a non-planarized layer.

Because the transmissive pixel electrode 312 in the transmissive portion 31 and the reflective pixel electrode 322 in the reflective portion 32 are driven by different data lines, refractive ratio of the liquid crystal layer between the transmissive portion 31 and a color filter and refractive ratio of the liquid crystal layer between the reflective portion 32 and a color filter can be adjusted by adjusting voltages applied to the transmissive pixel electrode 312 and the reflective pixel electrode 322 respectively, achieving the object of making the optical distances of the liquid crystal layer over the transmissive portion 31 and over the reflective portion 32 consistent with each other at last.

Figure 5:
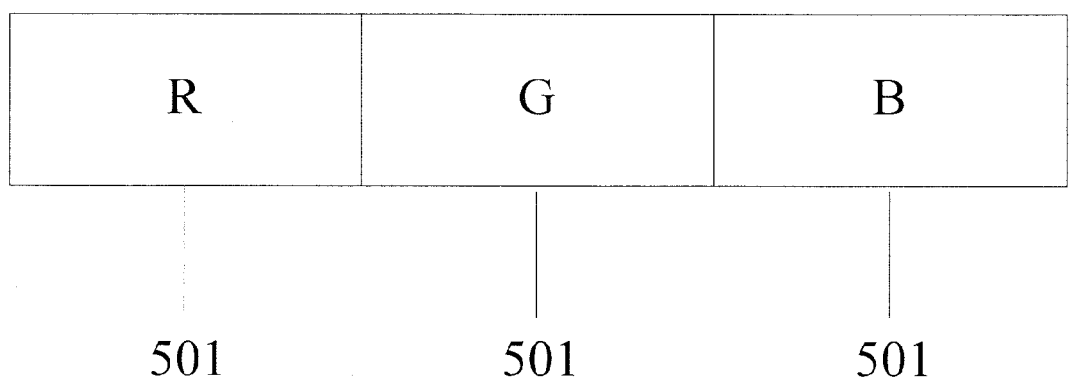
FIG. 5 is a schematic view showing one color filter unit provided by an embodiment of the present invention.

Further, the color filter substrate 43 of the liquid crystal panel comprises a plurality of color filter units; and each color filter unit corresponds to a pixel unit of the array substrate 41, for instance. As shown in FIG. 5, the color filter unit includes at least three color sub-units 501 having different colors; each of the color sub-units 501 corresponds to a subpixel unit 201 on the array substrate 21.

In the figure, three primary colors of red, green, and blue are illustrated as an example, In other examples, the color arrangement of the color sub-units 501 may also include other color schemes. The case in which three color sub-units 501 constitute one color filter unit has been explained as an example in the embodiment, but in other examples, the color filter unit may also contain four or more color sub-units.

The liquid crystal display panel according to an embodiment of the present invention can employ the following driving method, and the driving method comprising the following.

As shown in FIG. 3, each of the subpixel units 201 further includes a transmissive portion 31 and a reflective portion 32.

The transmissive portion 31 includes a transmissive thin film transistor 311 and a transmissive pixel electrode 312 connected to a drain of the transmissive thin film transistor 311; and the reflective portion 32 includes a reflective thin film transistor 321 and a reflective pixel electrode 322 connected to a drain of the reflective thin film transistor 321.

A gate of the transmissive thin film transistor 311 and a gate of the reflective thin film transistor 321 both are connected to a same gate line 33, and a source of the transmissive thin film transistor 311 and a source of the reflective thin film transistor 321 are connected to different data lines 34.

The data lines 34 are used to provide driving voltages to the transmissive pixel electrode 312 and the reflective pixel electrode 322, respectively.

As shown in FIG. 4, different voltages are applied to the transmissive pixel electrode 312 in the transmissive portion 31 and the reflective pixel electrode 322 in the reflective portion 32.

The transmissive portion 31 and the reflective portion 32 are driven respectively, so that the optical distance of the liquid crystal layer between the transmissive portion 31 and a color filter and the optical distance of the liquid crystal layer between the reflective portion 32 and a color filter are made substantially consistent with each other.

As different voltages for driving orientation of liquid crystals are applied to the transmissive pixel electrode 312 in the transmissive portion 31 and the reflective pixel electrode 322 in the reflective portion 32, an electric field produced by the transmissive portion 31 and an electric field produced by the reflective portion 32 are used to control orientation of the liquid crystals over these two portions, respectively. As different voltages are applied to the transmissive pixel electrode 312 and the reflective pixel electrode 322, liquid crystals over these two portions have different orientation angles. Thus, the liquid crystal layer has different refractive ratios n1 and n2 over the two portions. That is, refractive ratios n1 and n2 of the liquid crystal layer over the two portions can be adjusted by adjusting magnitudes of the voltages applied to the transmissive pixel electrode 312 and the reflective pixel electrode 322.

As shown in FIG. 4, for a same viewing angle, light emitted from a backlight source is transmitted through a color filter via the liquid crystal layer 42 over the transmissive portion 31, and the travel distance in the liquid crystal layer 42 is L1 (L1=a); while external light is incident into the liquid crystal layer 42 over the reflective portion and exits the color filters after being reflected by a metal reflective layer 323, and the travel distance in the liquid crystal layer 42 is L2 (L2=2a). According to the definition of optical distance, an optical distance is equal to a multiplication of a travel distance D of light in a medium by refractive ratio n of the medium, i.e., the optical distance=$D*n$. Thus the following can be obtained: the optical distance of the light emitted from the backlight source is $L1*n1$ ($a*n1$), and the optical distance of the reflected light is $L2*n2$ ($2a*n2$). Because the liquid crystal layer over the transmissive subpixel 31 and the liquid crystal layer over the reflective subpixel 32 are the same liquid crystal layer, $n1=n2$. As described above, the magnitudes of the n1 and n2 can be adjusted by adjusting voltages applied to the transmissive pixel electrode 312 and the reflective pixel electrode 322, respectively, so as to make $n1=2*n2$, i.e., $L1*n1=L2*n2$, eventually.

It should be noted that, in considering the travel distance in the liquid crystal layer 42 in the embodiment, for facilitating description and understanding, the thicknesses of the reflective layer 323, the transmissive pixel electrode 312 and the reflective pixel electrode 322 are not taken into consideration; while in the course of a practical production, the thickness of each of these layers may be taken into consideration, and voltages applied to the transmissive pixel electrode 312 and the reflective pixel electrode 322 are controlled more precisely, so as to make the optical distances of the liquid crystal layer over the transmissive portion 31 and the reflective portion 32 consistent with each other.

In an example, in general, at different timings, voltages for controlling the same transmissive pixel electrode are different, and voltages for controlling the same reflective pixel electrode are also different. However, at a same timing, a difference between a voltage for controlling a transmissive pixel electrode and a voltage for controlling a reflective pixel electrode can be made constant, and the difference is that necessary for eliminating an optical distance difference (a voltage difference necessary for increasing the refractive ratio n1 of the transmissive portion by twice to be n2). Furthermore, at a same timing, voltages for controlling transmissive pixel electrodes in different subpixel units are usually different and voltages for controlling reflective pixel electrodes in different subpixel units are usually different, but in the same subpixel unit, the difference between the voltage for controlling the transmissive pixel electrode and the voltage for controlling the reflective pixel electrode can be made constant as well. However, this does not indicate that in the entire course of display, the voltage for controlling the transmissive pixel electrode and the voltage for controlling the reflective pixel electrode are always different. For example, upon display of black or white, these two voltages can be the same.

Further, the color filter substrate 43 of the liquid crystal panel comprises the plurality of color filter units; and each color filter unit corresponds to a pixel unit, for instance. As shown in FIG. 5, the color filter unit includes at least three color sub-units 501 having different colors; each of the color sub-units 501 corresponds to a subpixel unit 201 on the array substrate 21.

In the figure, three primary colors of red, green, and blue are illustrated as an example. In other examples, other color arrangement may be applied to the color sub-units 501. The case in which three color sub-units 501 constitute one color filter unit has been explained as an example in the embodiment, but in other examples, the color filter unit may also contain four or more color sub-units.

The liquid crystal display panel and the method of driving the same eliminate, which are provided by the embodiments of the present invention, the optical distance difference between the transmissive light and the reflective light by applying different voltages to the transmissive pixel electrode and the reflective pixel electrode in a same subpixel unit, respectively. As electric fields produced between the voltages for the pixel electrodes and a common electrode may affect the refractive ratio of the liquid crystal layer, the refractive ratio of the liquid crystal layer between the transmissive portion and a color filter and the refractive ratio of the liquid crystal layer between the reflective portion and a color filter can be controlled by adjusting voltages applied to the transmissive pixel electrode and the reflective electrode. Thus, multiplications of the refractive ratios of the liquid crystal layer over the two portions by the travel distances of light (i.e., optical distance) can be made consistent with each other. Consequently, the optical distance difference is eliminated, and an object of improving the display effect is achieved.

The descriptions made above are merely the specific embodiments of the present invention, but the protection scope of the present invention is not limited thereto. All such modifications or replacements falling within the technical scope disclosed by the present invention as would be obvious to those skilled in the art are intended to be included within the protection scope of the present invention. Thus, the protection scope of the present invention shall be defined by the protection scope of the following claims.

The invention claimed is:

1. A liquid crystal display panel, comprising: an array substrate, a color filter substrate and a liquid crystal layer interposed between the array substrate and the color filter substrate, wherein
   the array substrate is formed with a plurality of gate lines, a plurality of data lines and a plurality of pixel units thereon, the pixel units comprise a plurality of subpixel units;
   each of the subpixel units includes a transmissive portion and a reflective portion,
   the transmissive portion comprises a transmissive portion thin film transistor and a transmissive pixel electrode connected to a drain of the transmissive portion thin film transistor, wherein the transmissive portion thin film transistor and the transmissive pixel electrode are located within the transmissive portion only,
   the reflective portion comprises a reflective layer, a reflective portion thin film transistor and a reflective pixel electrode connected to a drain of the reflective portion thin film transistor, wherein the reflective portion thin film transistor and the reflective pixel electrode are located within the reflective portion only,
   a gate of the transmissive portion thin film transistor and a gate of the reflective portion thin film transistor are connected to the same gate line, and a source of the transmissive portion thin film transistor and a source of the reflective thin film transistor are connected to different data lines;
   the color filter substrate comprises a plurality of color filter units, and the color filter unit comprises a plurality of color sub-units in different colors; and each of the color sub-units correspond to a subpixel unit on the array substrate,
   wherein there is no overlap between the transmissive portion and the reflective portion in a subpixel unit or between two adjacent subpixel units.

2. The liquid crystal display panel according to claim 1, wherein the reflective layer and the reflective pixel electrode overlap each other.

3. The liquid crystal display panel according to claim 1, wherein the reflective layer is a non-planarized layer.

4. The liquid crystal display panel according to claim 1, wherein a cross-section of the reflective layer is in a wave-like shape, triangle wave shape, or sawtooth wave shape.

5. The liquid crystal display panel according to claim 1, wherein a material of the reflective layer is a metal, a metal alloy, or a metal oxide substance having a reflectivity larger than or equal to that of aluminum.

6. The liquid crystal display panel according to claim 1, wherein the reflective layer and the reflective pixel electrode are integrally formed.

7. A method of driving the liquid crystal display panel according to claim 1, comprising:
   at a same timing for display, different voltages are applied to the transmissive pixel electrode of the transmissive portion and the reflective pixel electrode of the reflective portion in a same subpixel unit.

8. The method of driving the liquid crystal display panel according to claim 7, wherein in the subpixel unit, there is a difference between a voltage for driving the transmissive pixel electrode and a voltage for driving the reflective pixel electrode and the difference is kept constant, and accordingly an optical distance of the liquid crystal layer between the transmissive portion and color filters and an optical distance of the liquid crystal layer between the reflective portion and the color filters are substantially the same.

9. A liquid crystal display panel, comprising: an array substrate, a color filter substrate and a liquid crystal layer interposed between the array substrate and the color filter substrate, wherein
   the array substrate is formed with a plurality of gate lines, a plurality of data lines and a plurality of pixel units thereon, the pixel units comprise a plurality of subpixel units;
   each of the subpixel units includes a transmissive portion and a reflective portion, the transmissive portion comprises a transmissive portion thin film transistor and a transmissive pixel electrode connected to a drain of the transmissive portion thin film transistor,
   the reflective portion comprises a reflective layer, a reflective portion thin film transistor and a reflective pixel electrode connected to a drain of the reflective portion thin film transistor, wherein the reflective layer is disposed over or under the reflective pixel, and wherein the reflective portion thin film transistor and the reflective pixel electrode are located within the reflective portion only;
   a gate of the transmissive portion thin film transistor and a gate of the reflective portion thin film transistor are connected to the same gate line, and a source of the transmissive portion thin film transistor and a source of the reflective thin film transistor are connected to different data lines;
   the color filter substrate comprises a plurality of color filter units, and the color filter unit comprises a plurality of color sub-units in different colors; and each of the color subunits correspond to a subpixel unit on the array substrate.

10. The liquid crystal display panel according to claim 9, wherein the reflective layer and the reflective pixel electrode overlap each other.

11. The liquid crystal display panel according to claim 9, wherein the reflective layer is a non-planarized layer.

12. The liquid crystal display panel according to claim 9, wherein a cross-section of the reflective layer is in a wave-like shape, triangle wave shape, or sawtooth wave shape.

13. The liquid crystal display panel according to claim 9, wherein a material of the reflective layer is a metal, a metal alloy, or a metal oxide substance having a reflectivity larger than or equal to that of aluminum.

14. The liquid crystal display panel according to claim 9, wherein the reflective layer and the reflective pixel electrode are integrally formed.

15. A method of driving the liquid crystal display panel according to claim 9, comprising:
   at a same timing for display, different voltages are applied to the transmissive pixel electrode of the transmissive portion and the reflective pixel electrode of the reflective portion in a same subpixel unit.

16. The method of driving the liquid crystal display panel according to claim 15, wherein in the subpixel unit, there is a difference between a voltage for driving the transmissive pixel electrode and a voltage for driving the reflective pixel electrode and the difference is kept constant, and accordingly an optical distance of the liquid crystal layer between the transmissive portion and color filters and an optical distance of the liquid crystal layer between the reflective portion and the color filters are substantially the same.

17. A liquid crystal display panel, comprising: an array substrate, a color filter substrate and a liquid crystal layer interposed between the array substrate and the color filter substrate, wherein the array substrate is formed with a plurality of gate lines, a plurality of data lines and a plurality of pixel units thereon, the pixel units comprise a plurality of subpixel units;

each of the subpixel units includes a transmissive portion and a reflective portion, the transmissive portion comprises a transmissive portion thin film transistor and a transmissive pixel electrode connected to a drain of the transmissive portion thin film transistor, wherein the transmissive portion thin film transistor and the transmissive pixel electrode are located within the transmissive portion only, the reflective portion comprises a reflective layer, a reflective portion thin film transistor and a reflective pixel electrode connected to a drain of the reflective portion thin film transistor, wherein the reflective portion thin film transistor and the reflective pixel electrode are located within the reflective portion only, and the reflective layer is disposed over or under the reflective pixel, a gate of the transmissive portion thin film transistor and a gate of the reflective portion thin film transistor are connected to the same gate line, and a source of the transmissive portion thin film transistor and a source of the reflective thin film transistor are connected to different data lines;

the color filter substrate comprises a plurality of color filter units, and the color filter unit comprises a plurality of color sub-units in different colors; and each of the color sub-units correspond to a subpixel unit on the array substrate.

* * * * *